US00RE34715E

United States Patent [19]

Gudenau et al.

[11] E Patent Number: Re. 34,715

[45] Reissued Date of Patent: Sep. 6, 1994

[54] MULTIFUNCTION FLUID CHARGING DEVICE

[75] Inventors: Ronald A. Gudenau, Mt. Clemens; Charles Tamasiunas, Farmington, both of Mich.

[73] Assignee: Lucas Hartridge, Inc., Reston, Va.

[21] Appl. No.: 484,361

[22] Filed: Feb. 21, 1990

Related U.S. Patent Documents

Reissue of:

[64] Patent No.: 4,869,300
Issued: Sep. 26, 1989
Appl. No.: 95,641
Filed: Sep. 14, 1987

[51] Int. Cl.[5] ..... B65B 3/04

[52] U.S. Cl. ..... 141/59; 141/65; 251/149.6; 285/315

[58] Field of Search ..... 141/65, 66, 59; 285/315; 251/149.6; 137/606

[56] References Cited

U.S. PATENT DOCUMENTS

| | | | |
|---|---|---|---|
| 2,279,146 | 4/1942 | Schneller | 251/149.6 X |
| 2,887,124 | 5/1959 | Mehl | 137/614.06 |
| 2,962,096 | 11/1960 | Knox | 285/315 X |
| 3,195,930 | 7/1965 | Ascherl et al. | 285/27 |
| 3,291,152 | 12/1966 | Comer | 285/315 X |
| 3,352,333 | 11/1967 | Glasgow et al. | 141/383 |
| 3,825,223 | 7/1974 | Richardson | 251/149.6 |
| 3,935,713 | 2/1976 | Olson | 62/77 |
| 4,328,948 | 5/1982 | Pearl, II | 251/149.6 |
| 4,332,273 | 6/1982 | Boyce | 137/322 |
| 4,345,783 | 8/1982 | Bergstand | 285/12 |
| 4,375,297 | 3/1983 | Persson | 285/12 |
| 4,476,892 | 10/1984 | Boyce | 137/322 |
| 4,540,201 | 9/1985 | Richardson | 285/101 |
| 4,561,264 | 12/1985 | Johansson | 62/149 |
| 4,567,912 | 2/1986 | Levine | 137/606 |
| 4,592,387 | 6/1986 | Rogers | 137/614.06 |
| 4,805,417 | 2/1989 | Weaver et al. | 62/292 |

*Primary Examiner*—Ernest G. Cusick
*Attorney, Agent, or Firm*—Nixon & Vanderhye

[57] ABSTRACT

A device is disclosed for controlling the flow of refrigerant into a system and for controlling the application of a vacuum to evacuate the system via the same device prior to charging. The device is configured for controlling flow at the charging port to avoid loss of refrigerant from connecting lines. Piston operated valving internally mounted in a valve body controls the communication of refrigerant and vacuum sources to an outlet opening receiving a tubular charging port of the system to be charged. A pressure operated clamping piston actuates the gripping rings to secure the device to the charging port prior to both evacuation and charging and also acts to open the charging port valving as the fitting is clamped and sealed thereto. The outlet opening is defined by an end cap which is detachable from the fitting to allow use with different configuration charging ports by replacement with another end cap.

9 Claims, 5 Drawing Sheets

MULTIFUNCTION FLUID CHARGING DEVICE

Matter enclosed in heavy brackets [ ] appears in the original patent but forms no part of this reissue specification; matter printed in italics indicates the additions made by reissue.

BACKGROUND OF THE INVENTION

The present invention concerns devices for use in dispensing fluid into a reservoir, such as in charging air conditioning systems with a refrigerant.

In charging auto air conditioning systems during production, a fitting is typically manually secured to a system charging port to enable the introduction therein of refrigerant received under pressure from a source connected to the fitting.

The air conditioning system is also typically evacuated prior to charging by being connected to a vacuum source for an interval just before charging. In such high volume auto production situations, a valving console is often employed which successively connects the fitting to vacuum and refrigerant sources, after the fitting has been manually secured to the charging port.

In such situations, the need for making the connection manually is burdensome and slows the operation. The use of a separate valving console results in the escape of refrigerant in the line connecting the console to the fitting, wasting this material and creating an environmental problem. The preciseness of the fill volume is also compromised by the loss of refrigerant in the connecting line.

SUMMARY OF THE INVENTION

The present invention comprises a multifunction device having an end cap having a nozzle opening able to be received over a charging port and adapted to be fluid pressure clamped to the charging port. The clamping step also automatically opens a [Schroeder] *Schrader type* valve associated with the charging port, and seals the nozzle opening to the charging port.

The device contains a pair of piston valves actuated by fluid pressure successively applied by a sequencing control to connect either an inlet port in communication with a vacuum source, or an inlet port communicating with a source of pressurized refrigerant, to a nozzle opening formed in an end cap of the fitting.

The valving pistons are movable in bores formed in a main valve body member and act in one porition thereof, assumed upon the application of [air] *fluid* pressure, to place corresponding inlet ports in communication with the nozzle opening.

A clamping piston is mounted within the valve body to be movable in opposite directions upon the application of air presure supplied via internal passages on either side of the piston, and acts to cause gripping rings to move radially inward and at the same time brings an O-ring seal into contact with the open end, while also bringing an elongated element into contact with the [Schroeder] *Schrader type* valve stem located within the charging port.

DETAILED DESCRIPTION

Figure 1:
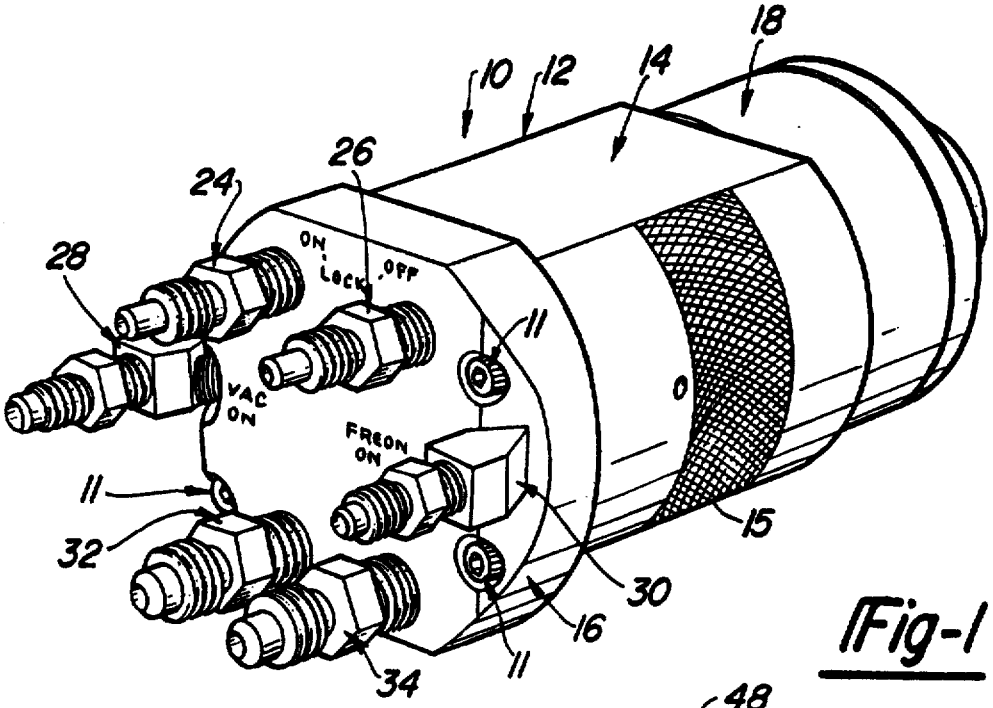
FIG. 1 is a perspective view of the device according to the present invention.

In the following description, a particular embodiment is described in accordance with the requirements of 35 USC 112, and specific terminology employed for the sake of clarity, but it is to be understood that the same is not intended to be limiting, inasmuch as the invention is capable of taking many forms within the scope of the appended claims.

Referring to the drawings, the multifunction device 10 according to the present invention is comprised of a valve body assembly 12 including a generally elongate main valve body member 14 having an inlet porting cap 16 affixed at one end by capscrews 11 and an end cap 18 affixed at the other end.

The device 10 is sized to be manually grasped as at central knurled area 15, to be placed on a charging port, comprised of an inlet tube [20] connected to the system to be charged. A [Schroeder] *Schrader type* valve is typically employed, having a valve stem [22] which when pushed controls opening of the valve in the manner well known to those skilled in the art.

The inlet porting cap 16 carries three pairs of line connector fittings, "on-off" clamping air pressure connector fittings 24, 26, vacuum "on" air pressure connector fittings 28, refrigerant "on" air pressure connector fitting 30, vacuum source connector fitting 32, and refrigerant connector fitting 34.

Figure 2:
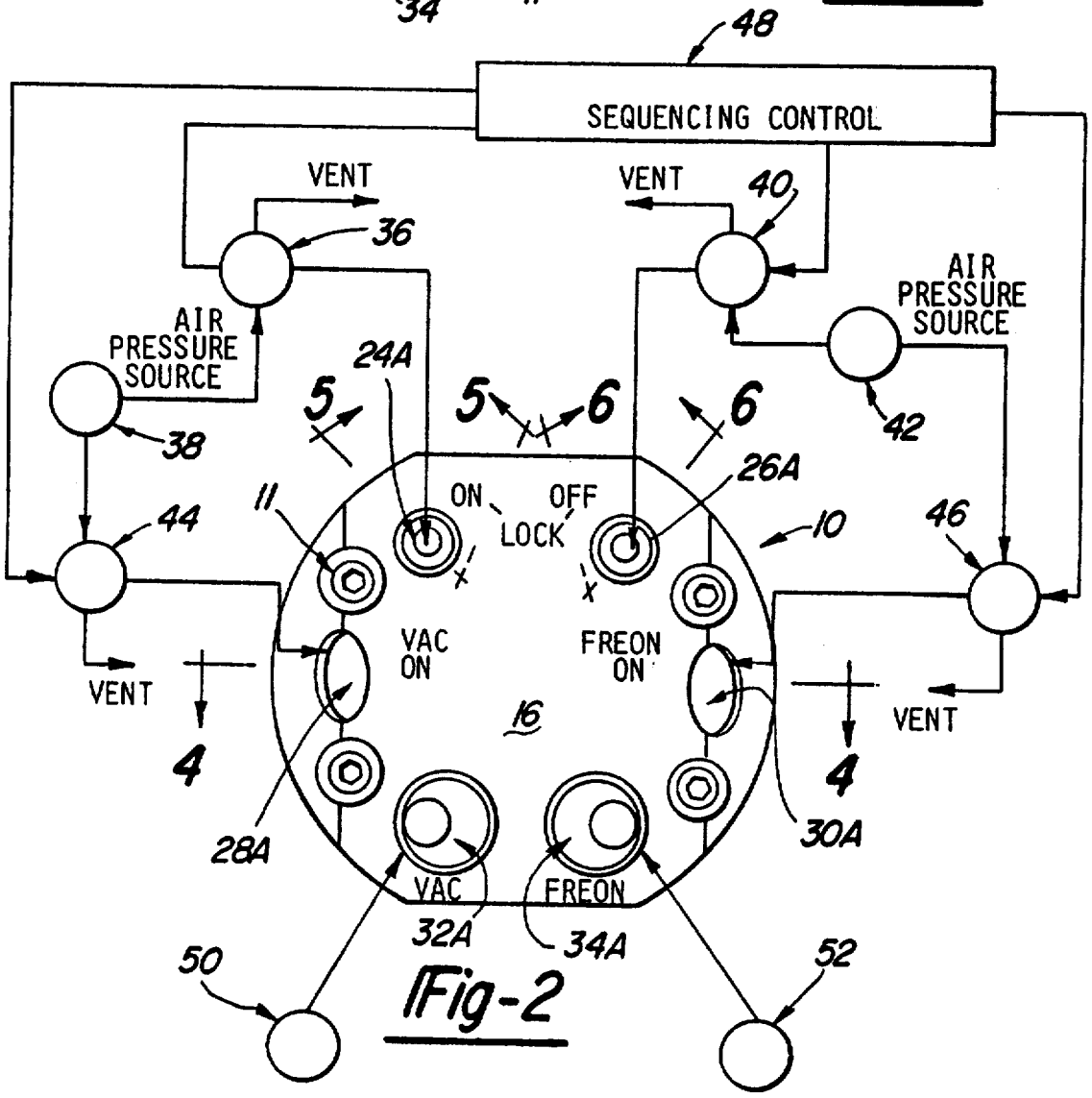
FIG. 2 is an upper end view of the device shown in FIG. 1, showing the various inlet ports, together with a schematic depiction of the system connections thereto.
Figure 3:
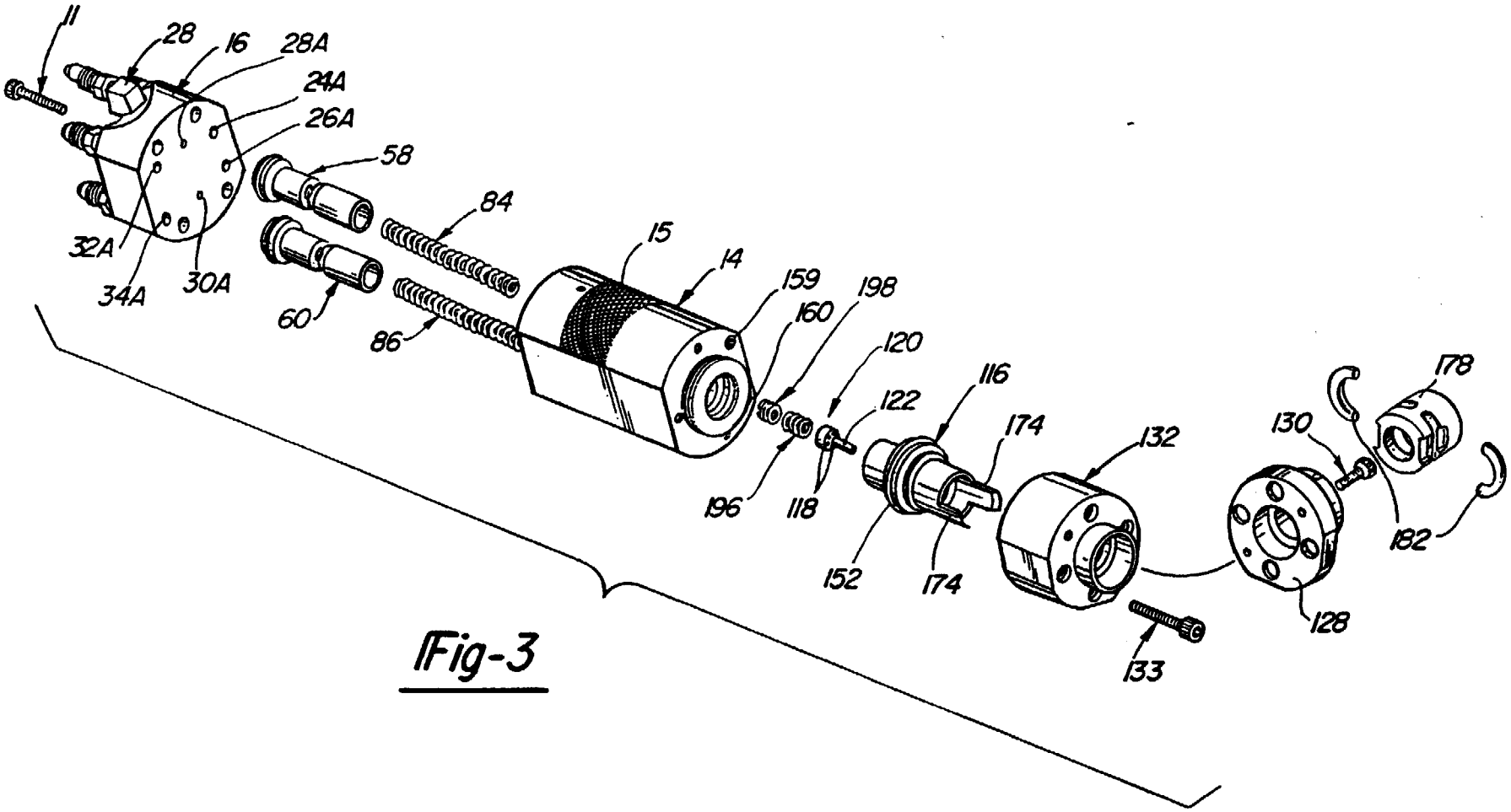
FIG. 3 is an exploded perspective view of the components of the device shown in FIG. 1.

FIG. 2 illustrates the corresponding ports 24A–34A formed in porting cap 16, and schematic of the remaining fluid circuit.

Fluid lines (not shown) are connected to each connector fitting 24–34. Port 24A is connected to a two-way valve 36 which in turn connects port 24A either to a source of air pressure 38 or to a vent as shown, and port 26A is connected to a two-way valve 40, connecting port 26A to a pressure source 42 or vent.

Similarly, port 38A is connected to a two-way valve 44 which in turn connects port 28A either to pressure source 38 or vent, and port 30A is connected to a two-way valve 46 which in turn connects port 30A to pressure shource 42 or vent.

The operation of the two-way valves 36, 40, 44, 46, is by solenoids (not indicated) under the control of the sequencing control circuit indicated at 48.

Port 32A is directly connected to a source of vacuum 50 while port 34A is connected to a source of pressurized refrigerant 52.

Valving means is provided to provide selective control over communication between each port 32A and 34A and an outlet in the end cap assembly 18 (FIG. 4), with actuation by means of air pressure introduced at ports 28A and 30A.

The valving means includes a pair of valving pistons 56, 58 slidably fit within bore 60, 62 respectively formed in the main valve body member 14 while O-rings 71, 73 seal each bore 72 and 74 against the escape of air pressure through the interface of porting cap 16 and main valve body member 14. O-ring seals 64, 66 and 68, 70 create fluid tight chambers 72, 74 above each piston 56, 58 respectively while O-rings 71, 73 seal each bore 72 and 74 against the escape of air pressure through the interface of porting cap 16 and main valve body member 14. Recesses 76, 68 are formed into the top of each piston to ensure application of air pressure introduced into chamber 72 or 74 via ports 28A and 30A is exerted on an appreciable area of each piston 56, 58.

Each piston 56 and 58 is formed with a hollow 80, 82 in the lower end receiving a compression spring 84, 86 respectively each of which urge the associated spring upwardly in opposition to fluid pressure in chamber 72 or 74.

When either piston 56 or 58 is in the down position, ports 88 or 90 extending about the skirt of piston 56 or 58 respectively and into hollows 80, 82 thereof respectively, are brought into alignment with annular groove 92, 94 and when in the normal up position grooves 92 or 94 are blocked by the outside of piston 56 or 58.

Figure 8:
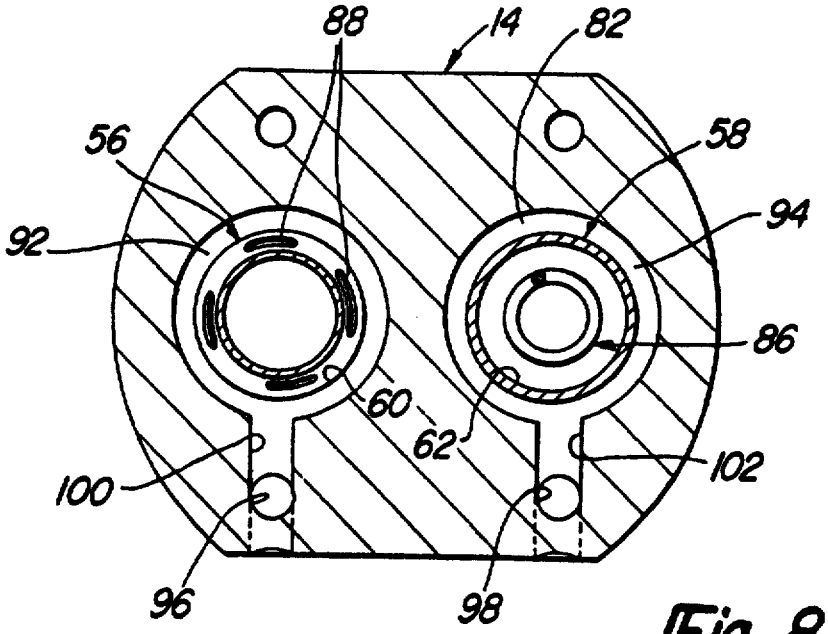
FIG. 8 is a view of the transverse section 8—8 taken through the device shown in FIG. 4.

Groove 92 and 94 are in turn continuously pressurized during operation of the apparatus via ports 32A, 34A with a vacuum and pressurized refrigerant respectively. FIG. 8 shows that this is accomplished by internal passsages 96 and 98 extending length wise from ports 32A and 34A alongside bores respectively, intersection cross passages 100, 102 respectively. The outside section may be plugged after drilling as by welding as shown. O-ring seals 104, 106, 108 and 110 prevent leakages to or from grooves 92, 94 respectively.

Vacuum or pressurized refrigerant is applied via central bore 112, and thence through a bore 114 extending through a clamping piston 116; past openings 118 in a [Schroeder] *Schrader type* valve operating member 120; through a clearance between a rod element 122 of member 120 and a smaller diameter bore 124 in piston 116; and through an internal cavity 126 of piston 116 to outlet nozzle opening 54.

End cap 18 is comprised of a nose piece 128 secured by capscrews 130 to an intermediate sleeve 132, in turn secured with capscrews 133 to the end face of main valve body member 14.

Clamping piston 116 is formed with a first reduced diameter end 136 piloted in bore 138 of main valve body member 114, and a second reduced diameter end 140 piloted in a bore 142 formed in intermediate sleeve 132.

An intermediate larger diameter piston portion 144 is received in bore 146 to define upper and lower chambers 148 and 150, isolated from each other by O-ring 152 carried by piston portion 144, and sealed with O-rings 154 and 156.

Figure 5:
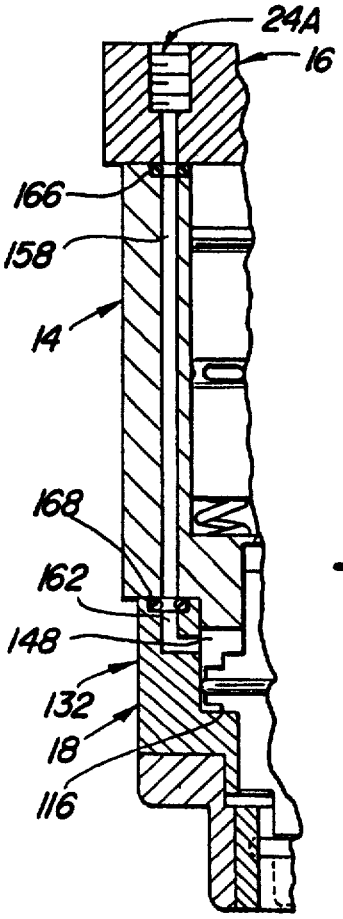
FIG. 5 is a fragmentary view of section 5—5 taken in FIG. 2.
Figure 6:
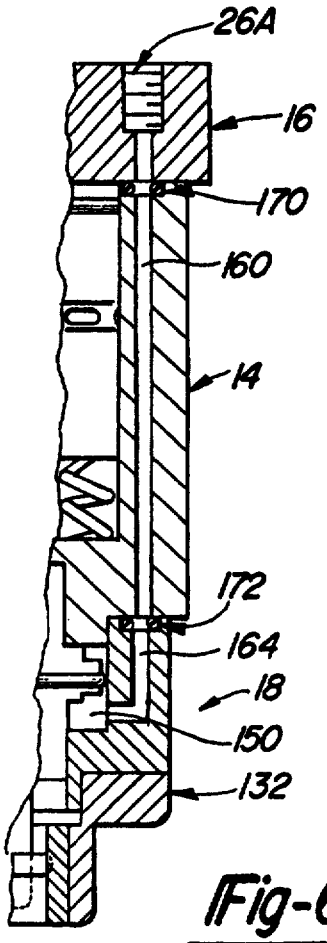
FIG. 6 is a fragmentary view of the section 6—6 taken in FIG. 2.

Air pressure is supplied to either chamber 148 or 150 by internal passages 158 and 160 extending from ports 24A and 26A respectively (FIGS. 5 and 6) through main valve body member 14, and internal passages 162 and 164 in intermediate sleeve 132. O-ring 166, 168, 170, 172 seal the passages 158, 160 at the interface of porting plac 16 and main valve body member 14, and intermediate sleeve 132. Clamping piston 116 thus is forced either up or down by the application of air pressure at port 24A or 26A.

Clamping piston 116 is formed with a pair of opposed curved blades or tangs 174 extending into corresponding peripheral recesses 176 formed in a sleeve 178 defining nozzle outlet 54, sleeve 178 pressed into bore 180 of nos piece 128. Sleeve 178 carries a pair of gripping rings 182 received in circumferential opposed slots 184 machined into sleeve 178.

Figure 7:
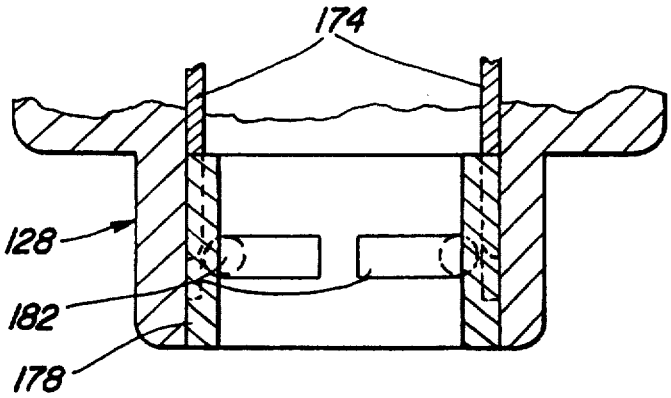
FIG. 7 is an enlarged sectional view of the end cap of the device shown in FIG. 1 [showing the mating engagement with an inlet charging tube of a system to be charged].

FIG. 7 illustrates that as clamping piston 116 descends, tangs 174 cam the gripping rings 182 radially inward towards the inlet the [20] inserted into opening 54. [A groove 186] *An annular feature of the inlet tube* therein is aligned with the gripping rings 182, so that a clamping action occurs by the rings 182 moving into the [groove 186 *annular feature*.

A retainer ring 188 is pressed into cavity 16 of clamping piston 116 bringing O-ring 190 aligned with chamber opening 192.

Thus, inlet tube [20] is sealed by movement of the clamping piston 116 bringing O-ring 190 against the end face [194] thereof.

Simultaneously, rod element 122 is moved against *the* valve *of the Schrader type valve,* stem [22] to open the [Schroeder] *Schrader type* valve (not shown) establishing communication between the vacuum port 24A or refrigerant port 26A and the system to be charged.

A spring 196 and annular retainer 198 act to urge the member 120 outward, allowing some [last] *lost* motion as the [Schroeder] *Schrader type* valve is fully opened and the piston 116 moves to the full down position.

Thus, the operator need only position the device 10 over the inlet tube [20], with clamping, sealing and opening of the [Schroeder] *Schrader type* valve completed by the application of clampng air pressure.

The application of vacuum and then refrigerant is accomplished by the same fitting by application of air pressure to piston 58 and thereafter piston 60. The valving of the refrigerant is at the point of charging to eliminate the loss of refrigerant and the imprecision resulting from the use of long connecting lines.

Figure 4:
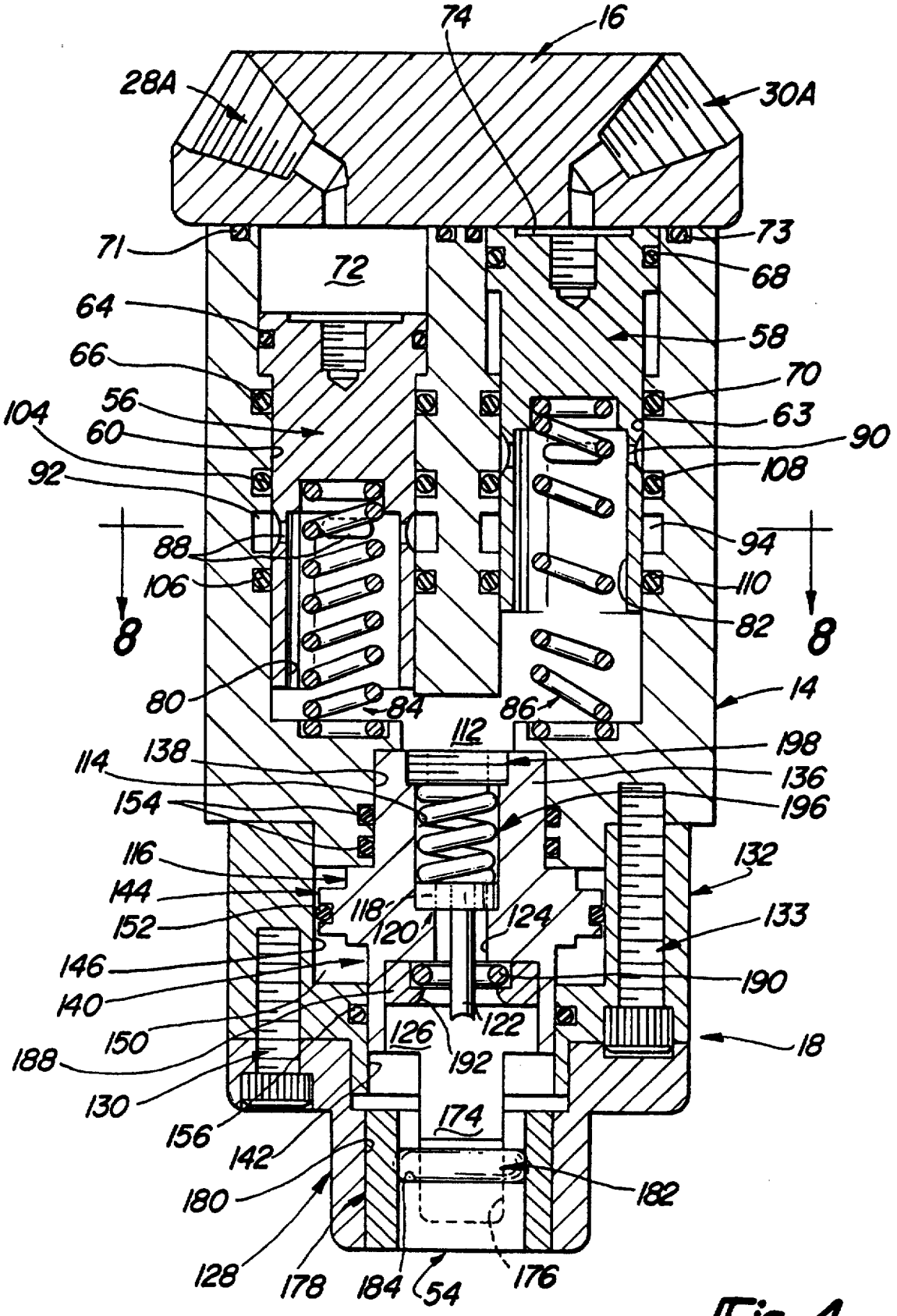
FIG. 4 is a view of the longitudinal section 4—4 taken in FIG. 2.

Disconnect is also simply achieved by the application of air pressure to move piston 116 upward, after both vacuum and refrigerant ports are sealed by movement of pistons 58 and 60 upward, as viewed in FIG. 4, by the release of air pressure in chambers 72 and 74.

Figure 9:
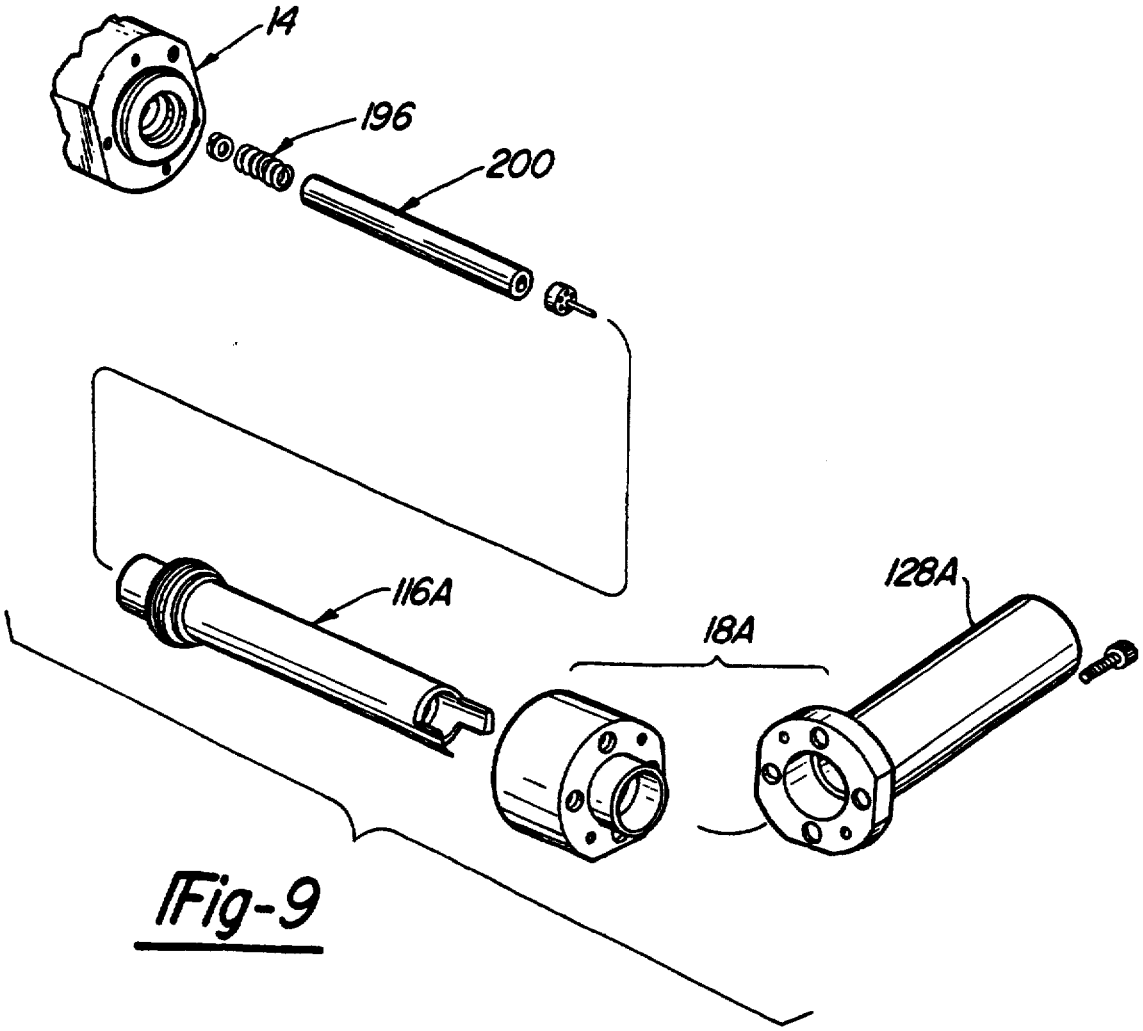
FIG. 9 is an exploded perspective view of the end of the main valve body and an alternately configured end cap and associated components attachable thereto.

The end cap 18 is detachable so as to be repalced with end caps of differing configurations, as to be fit to different size valves, and for different installations. Such an end cap 18A is shown in FIG. 9, extended in length so as to facilitate reaching relative inaccessible inlet tubes [20]. In this case a longer length nose piece 128A is employed as well as [a] *an* extended length clamping piston 116A, necessitating a [space] *spacer* tube 200 to reach member 120. This is mated to the remaining components without any modification to enable use of the same fitting 10 for various requirments.

Many variations of the specific arrangement are of course possible.

We claim:

1. A device for dispensing a pressurized fluid into a system, said system including a charging inlet tube, and device comprising:

a valve body assembly, including an end cap having an end cap nozzle opening adapted to be received over said inlet tube;

air operated clamping means for clamping said inlet tube within said end cap opening;

said clamping means including a clamping piston, and a bore formed in said valve body assembly, said clamping piston movably mounted in said bore in said valve body assembly for movement between clamping and unclamping positions;

said clamping means further including a series of clamping elements moved radially inward upon movement of said clamping piston to said clamping position;

air pressure inlet porting means on said valve body assembly for connection to a source of clamping means air pressure;

first internal passage means in said valve body assembly connecting said air inlet porting means and said bore in said valve body assembly included in said clamping means;

respective vacuum and pressurized fluid porting means on said valve body assembly for connection to a source of vacuum and pressurized fluid respectively;

selectively operable distributor valving means within said valve body assembly for selectively communicating said vacuum or said pressurized fluid porting means to said end cap nozzle opening to allow applying a vacuum to said system and thereafter dispensing pressurized fluid thereinto through said end cap nozzle opening;

[air] *fluid* pressure activating means for operating said distributor valving means by the application of [air] *fluid* pressure;

a [Schroeder] *Schrader type* valve stem engagement member having a rod element centered with respect to said end cap opening, and [air] *fluid pressure* operated actuating means [bring] *bringing* said rod element into engagemnt with a [Schroeder] *Schrader type* valve stem when said device is clamped to an inlet tube equipped with a [Schroeder] *Schrader type* valve;

valve actuator porting means comprising a series of ports adapted to be connected to [air lines] *pressurized fluid* communicating with said distributor valving means and said [air] *fluid* pressure actuating means to enable selective operation of said distributor valving means.

2. The device according to claim 1 wherein said distributor valving means includes a pair of valving pistons, and a pair of bores formed in said valve body assembly, said valving pistons slidably mounted within a respective one of said pair of [pores] *bores* formed in said valve body assembly, said valve actuator porting means communicating with said bores to be connected to said a source of [air] *fluid* pressure thereto to thereby cause movement of said pistons in said bores; said distributor valving means further including second internal passage means in said valve body assembly causing communication of said vacuum porting means with said end cap nozzle opening upon pressurization of one of said bores and movement of one of said pistons; and, of said pressurized fluid porting means with said end cap nozzle opening upon pressurization of the other of said bores and resultant movement of said other piston.

3. The device according to claim 2 wherein each of said pistons is spring biased against said movement and wherein neither of said vacuum or [refrigerant] *pressurized fluid* porting means are in communication via said second internal passage means with said end cap nozzle opening when neither of said bores is pressurized.

4. the device according to claim 1 wherein said [Schroeder] *Schrader type* valve stem engagement member is mounted to said clamping piston for movement therewith, said rod element extending outwardly towards said end cap opening to be brought into engagment with a [Schroeder] *Schrader type* valve stem by movement of said clamping piston to the clamping position.

5. The device according to claim 4 wherein said engagement member includes a base affixed to said element, a bore formed in said clamping piston, said base slidably mounted in said bore formed in said clamping piston; said bore having a shoulder defined by a stepped diameter portion of said bore, said element extending through said stepped portion, and a spring acting on said base urging said bore against said shoulder.

6. The device according to claim 5 wherein said bore in said clamping piston defines in part said second internal passage means, and wherein said base is formed iwth one or more through openings allowing fluid flow into said stepped diameter passage.

7. The device according to claim 1 wherein said clamping means includes a sleeve having circumferential recesses formed therein, and wherein said series of clamping elements comprise a plurality of gripper ring segments carried in said recesses about said sleeve, and further including projecting curved blade portions extending from one end of said clamping piston, said blade portions received into said recesses to be movable therein upon movement of said piston to a clamping position to force said ring segments radially inward to be adpated to grip said charging inlet tube.

8. The device according to claim 7 wherein said clamping piston is formed with a counterbore opening towards said end cap nozzle opening into which said stepeed diameter passage opens, said counterbore carrying on O-ring adapted to sealingly engage said charing inlet tube upon movement of said piston to said clamping position.

9. The device according to claim 1 wherein said valve body assembly includes a main valve body member, said end cap is detachably secured to one end of said main valve body member to allow replacement with end caps having openings of a different configuration to adapt to different charging inlet tubes.

* * * * *